United States Patent
Geibel et al.

(10) Patent No.: US 9,677,647 B2
(45) Date of Patent: Jun. 13, 2017

(54) TENSIONING OR GUIDE RAIL HAVING A CONTINUOUS RECESSED SLIDING BODY

(71) Applicant: iwis motorsysteme GmbH & Co. KG, Munich (DE)

(72) Inventors: Henning Geibel, Wessling (DE); Renzo Perissinotto, Munich (DE)

(73) Assignee: IWIS MOTORSYSTEME GMBH & CO. KG, Munich (DE)

( * ) Notice: Subject to any disclaimer, the term of this patent is extended or adjusted under 35 U.S.C. 154(b) by 115 days.

(21) Appl. No.: 14/852,297

(22) Filed: Sep. 11, 2015

(65) Prior Publication Data
US 2016/0097439 A1    Apr. 7, 2016

(30) Foreign Application Priority Data

Oct. 2, 2014 (DE) .................. 10 2014 014 719

(51) Int. Cl.
*F16H 7/08* (2006.01)
*F16H 7/18* (2006.01)

(52) U.S. Cl.
CPC ............ *F16H 7/08* (2013.01); *F16H 7/18* (2013.01); *F16H 2007/0812* (2013.01); *F16H 2007/0872* (2013.01); *F16H 2007/0893* (2013.01); *F16H 2007/185* (2013.01)

(58) Field of Classification Search
CPC ......... F16H 7/08; F16H 7/18; F16H 2007/185; F16H 2007/0872
See application file for complete search history.

(56) References Cited

U.S. PATENT DOCUMENTS 5,820,502 A    10/1998    Schulze

FOREIGN PATENT DOCUMENTS

| DE | 4310306 A1 | 10/1994 |
| DE | 29602917 U1 | 6/1997 |
| DE | 19719732 C1 | 11/1998 |
| DE | 102006033122 A1 | 1/2008 |
| DE | 102007026939 A1 | 12/2008 |
| DE | 202011109363 U1 | 5/2013 |

*Primary Examiner* — William E Dondero
*Assistant Examiner* — Mark K Buse
(74) *Attorney, Agent, or Firm* — Baker & Hostetler LLP

(57) ABSTRACT

A tensioning or guide rail for a drive chain, in particular for a chain drive of an internal combustion engine, comprises a carrier body with at least two chain guide sections and with at least one recessed section. The at least one recessed section is arranged between two chain guide sections and recessed relative to a tangent connecting the adjoining chain guide sections, the at least two chain guide sections having each a sliding-contact surface for contacting the drive chain. A continuous sliding body is arranged on the carrier body along the at least two chain guide sections and the at least one recessed section, the sliding body defining the sliding-contact surfaces of the at least two chain guide sections and a surface of the at least one recessed section, the surface facing the drive chain.

10 Claims, 3 Drawing Sheets

TENSIONING OR GUIDE RAIL HAVING A CONTINUOUS RECESSED SLIDING BODY

CROSS-REFERENCE TO RELATED APPLICATION

This application claims priority to foreign German patent application No. DE 10 2014 014 719.3, filed on Oct. 2, 2014, the disclosure of which is incorporated by reference in its entirety.

FIELD OF THE INVENTION

The present invention relates to a tensioning or guide rail for a drive chain, in particular for a chain drive of an internal combustion engine, comprising a carrier body with at least two chain guide sections and with at least one recessed section, said at least one recessed section being arranged between two chain guide sections and recessed relative to a tangent connecting the adjoining chain guide sections, and said at least two chain guide sections having each a sliding-contact surface for contacting the drive chain. In addition, the present invention relates to a chain drive comprising such a tensioning or guide rail.

BACKGROUND

Tensioning devices comprising a chain tensioner as well as a tensioning and guide rail are used quite generally wherever chain drives are used. A preferred field of application is, however, the use in internal combustion engines, in which a timing chain drive drives the camshaft by means of a timing chain. In this field of application, high demands have to be satisfied with respect to the strength of the rails as well as the sliding and guiding characteristics in the area of contact with the endlessly circulating drive chain, since the drive chain must be kept under a defined tension during operation. In addition, manufacturing tolerances and an elongation of the drive chain occurring in the case of prolonged use are compensated for by the tensioning device. Conventional tensioning or guide rails consist either completely of a suitable plastic material provided with a sliding-contact surface for contact with the drive chain or of a carrier body provided with a sliding lining. The carrier body, which may be configured as a metal carrier or as a fiber-reinforced plastic profile, may be provided with a separate low-friction sliding body so as to form the sliding lining in the area of the surface contacting the chain.

DE 296 02 917 U1 discloses a tensioning rail for a timing chain drive, comprising a carrier body made of fiber-reinforced plastics and a sliding body made of low-friction plastics. The carrier body and the sliding body are produced separately of one another as prefabricated units. During final assembly, the sliding body is mechanically connected to the carrier body by means of form-fit elements. In the case of the tensioning or guide rail according to DE 43 103 06 A1, however, the sliding body is injection molded onto a carrier body of fiber-reinforced plastics by means of an injection molding process. DE 197 19 732 C1 discloses a guide rail for a chain drive, said guide rail comprising two spaced-apart sliding sections arranged on a common carrier. In addition, reference DE 10 2007 026 939 A1 discloses an integrally formed sliding element for a chain drive, in the case of which the surface facing a chain has at least one recessed section, which is not in contact with the chain.

Although many of the tensioning or guide rail structural designs known in the prior art proved to be very useful in practice, it is, due to the general pressure for innovations in the field of automotive industry, constantly endeavored to improve existing structural designs and to adapt them to the increasing demands. In addition, there are always cases of use, which necessitate an adaptation of the structural design or a change in the basic concept, and in this connection it will always be necessary to take into account the fundamental demands on tensioning or guide rails, the lowest possible frictional resistance to the drive chain, a low weight and a compact structural design. In addition, tensioning or guide rails are mass-produced articles which, with respect to the high numbers of pieces involved, constantly necessitate that the materials and structural designs used are replaced by less expensive or synergetic concepts.

SUMMARY OF THE INVENTION

It is therefore the object of the present invention to provide an innovative tensioning or guide rail, in the case of which the general demands on tensioning or guide rails are taken into account and which can be produced at a reasonable price.

According to the present invention, this object is achieved in that a continuous sliding body is provided, which is arranged on the carrier body along the at least two chain guide sections and the at least one recessed section, said sliding body defining the sliding-contact surfaces of the at least two chain guide sections and a surface of the at least one recessed section, said surface facing the drive chain. The provision of a continuous one-piece sliding body on a wavelike carrier body comprising at least two protruding chain guide sections, which are provided for contacting the drive chain, and a recessed section, which is arranged therebetween and at which the drive chain is not in contact with the rail, allows a cost-effective overall concept in spite of the special structural design. The continuous one-piece sliding body allows the use of the sliding body that can be produced from a low-friction plastic material for configuring the sliding-contact surface of the at least two chain guide sections for contacting the drive chain, and it also allows to save additional fastenings and assembly costs, if a plurality of sliding linings or sliding-contact surfaces is used. Making use of the continuous sliding body having a low-friction sliding-contact surface, the advantages accomplished by a reduction of friction through two separate chain guide sections can be utilized effectively, in spite of a cost-effective structural design. Due to the division and reduction of the sliding-contact surface used for contacting the drive chain, the resultant force applied by the drive chain to the tensioning or guide rail can be divided into two areas, whereby the total friction acting on the chain guide sections can be reduced. In addition to the normal mechanical fastening of a separate sliding body to a carrier body consisting of a fiber-reinforced plastic material, light metal or a composite material, the sliding body consisting of a low-friction plastic material may also be attached to the prefabricated carrier body by means of injection molding, or the tensioning or guide rail in its entirety may be produced in a two-component injection molding process.

According to an advantageous embodiment, at least one downholder is provided on the carrier body in the at least one recessed section. This allows easy fixing of the sliding body to the carrier body in the at least one recessed section. The downholder itself may here be formed on the carrier body, preferably such that it is integral therewith, whereby the sliding body can easily be fixed in position by means of undercut or form-fit elements. A downholder may, however, also be formed by the contour of the sliding body.

According to an expedient embodiment, the carrier body comprises at least one cheek extending in the area of the recessed section at least partially above the tangent. Such a cheek provided on the carrier body, preferably cheeks provided on both sides, allows/allow reliable guiding of the drive chain also in the recessed section of the tensioning or guide rail. The at least one cheek may also extend into an adjoining chain guide section so that the drive chain can also here be guided more effectively. According to an advantageous embodiment, the at least one cheek may have provided thereon a downholder. The provision of downholders on a cheek or on cheeks arranged on both sides allows the sliding body to be fixed in the at least one recessed section in a cost-effective and reliable manner. Alternatively, the cheek(s) may also remain below the tangent in the area of the recessed section.

In the case of one variant of the tensioning or guide rail, the carrier body comprises trusslike stiffeners. Trusslike stiffeners allow, independently of the manufacture and the material of the carrier body, an increase in strength and, simultaneously, a low weight of the carrier body.

According to a preferred embodiment, the sliding body comprises an opening in the area of the at least one recessed section. In addition to a reduction of the amount of material required and, consequently, a reduction of weight, the opening allows a higher flexibility of the sliding body and thus easy and safe mounting as regards the provision of downholders in the area of the recessed section. According to an advantageous embodiment, the opening may be formed centrally on the sliding body. A hole enclosed by the sliding body can have larger dimensions than a laterally provided opening, the strength being the same in both cases. Hence, a higher reduction of weight can be accomplished by said hole. In addition, the portions of the sliding body encompassing the hole can be fixed more reliably by the downholder.

According to another embodiment, the sliding body comprises respective convex sections in the area of the meshing end and in the area of the exit end of the drive chain, the convex sections in the area of the meshing end and in the area of the exit end of the drive chain having provided between them at least one concave section or one straight section. The convex sections at the entrance and exit ends of the drive chain allow a trouble-free transition from the and into the non-guided area of the drive chain and reduce thus the development of noise as well as the friction resistance at the tensioning or guide rail. Whereas in cases where convex sections merge with a concave section in the area of the recessed section of the rail, a smooth transition with a turning point will be created in the contour of the sliding body, a straight section between the convex sections of the meshing end and of the exit end will result in a tangential transition.

The present invention additionally relates to a chain drive of an internal combustion engine, in particular a timing chain drive, comprising a drive sprocket and a driven sprocket, a drive chain connecting the drive sprocket and the at least one driven sprocket, and a tensioning or guide rail contacting the drive chain, according to one of the above embodiments. In addition to the cost-effective manufacture of this chain drive, the division of the resultant normal force results in reduced friction and provides thus also the possibility of downgrading the structural design or the material of the tensioning or guide rail.

BRIEF DESCRIPTION OF THE DRAWINGS

In the following, embodiments of the present invention will be explained in more detail making reference to the drawings, in which.

DETAILED DESCRIPTION

Figure 1:
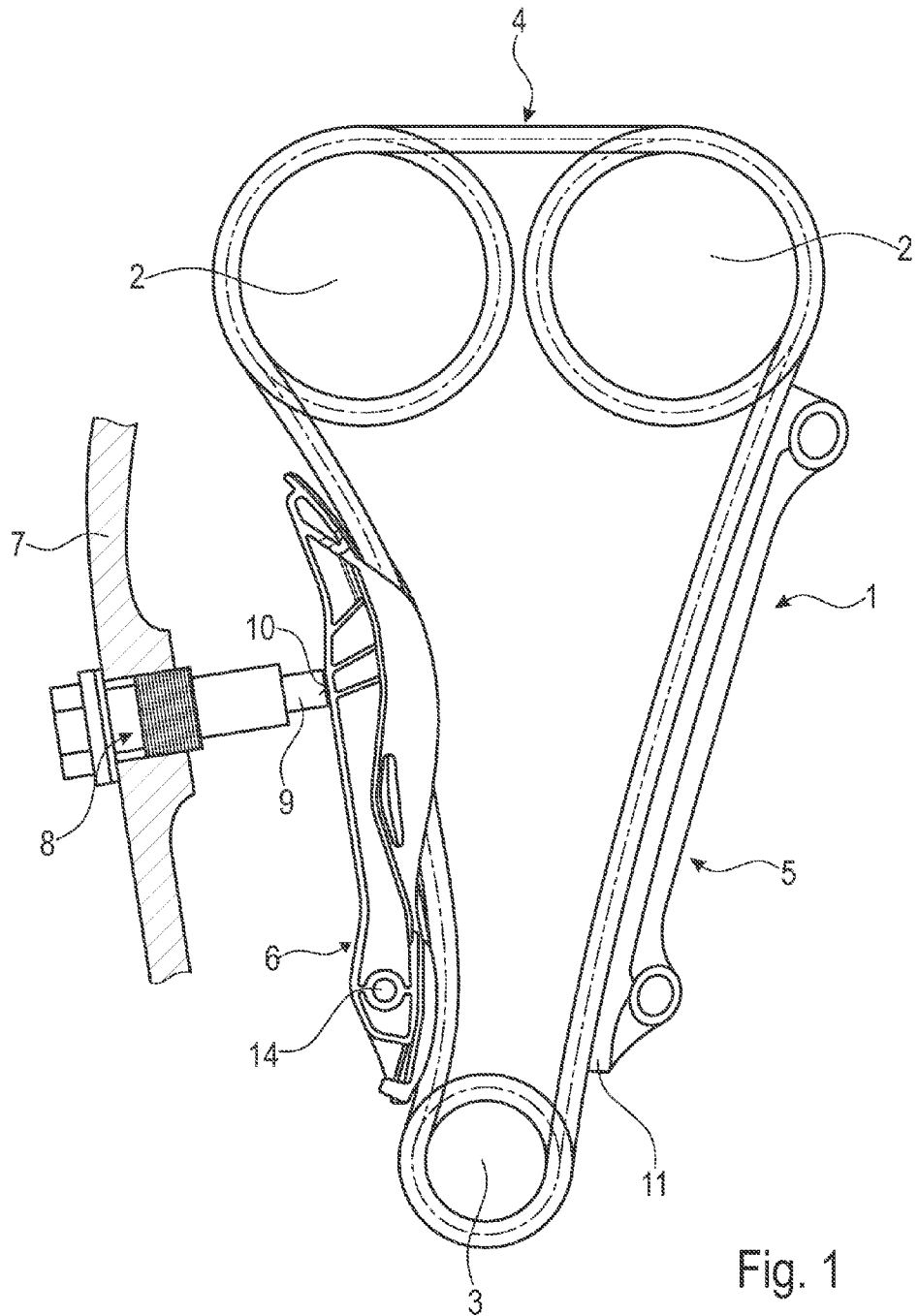
FIG. 1 shows a schematic view of a chain drive according to the present invention.

The timing chain drive 1 of an internal combustion engine shown schematically in FIG. 1 comprises two upper camshaft sprockets 2, a lower crankshaft sprocket 3, an endless drive or timing chain 4 wrapped around said sprockets, a conventional guide rail 5 for guiding the timing chain 4 in the tight span of the timing chain drive 1, and a pivotably arranged tensioning rail 6 pressing against the timing chain 4 in the slack span of the timing chain drive 1. The tensioning rail 6 is pressed against the timing chain 4 by means of a tensioning device 8 arranged in the engine case 7. The tensioning device 8 is here preferably configured as a hydraulically operated chain tensioner, which is connected to the engine oil hydraulics, so that the tensioning piston 9 of the tensioning device 8 presses against a press-on area 10 of the pivotably arranged tensioning rail 6. The conventionally designed guide rail 5 rests, with the sliding-contact surface of its sliding body 11, against the outer side of the timing chain 4 running therealong.

Figure 2:
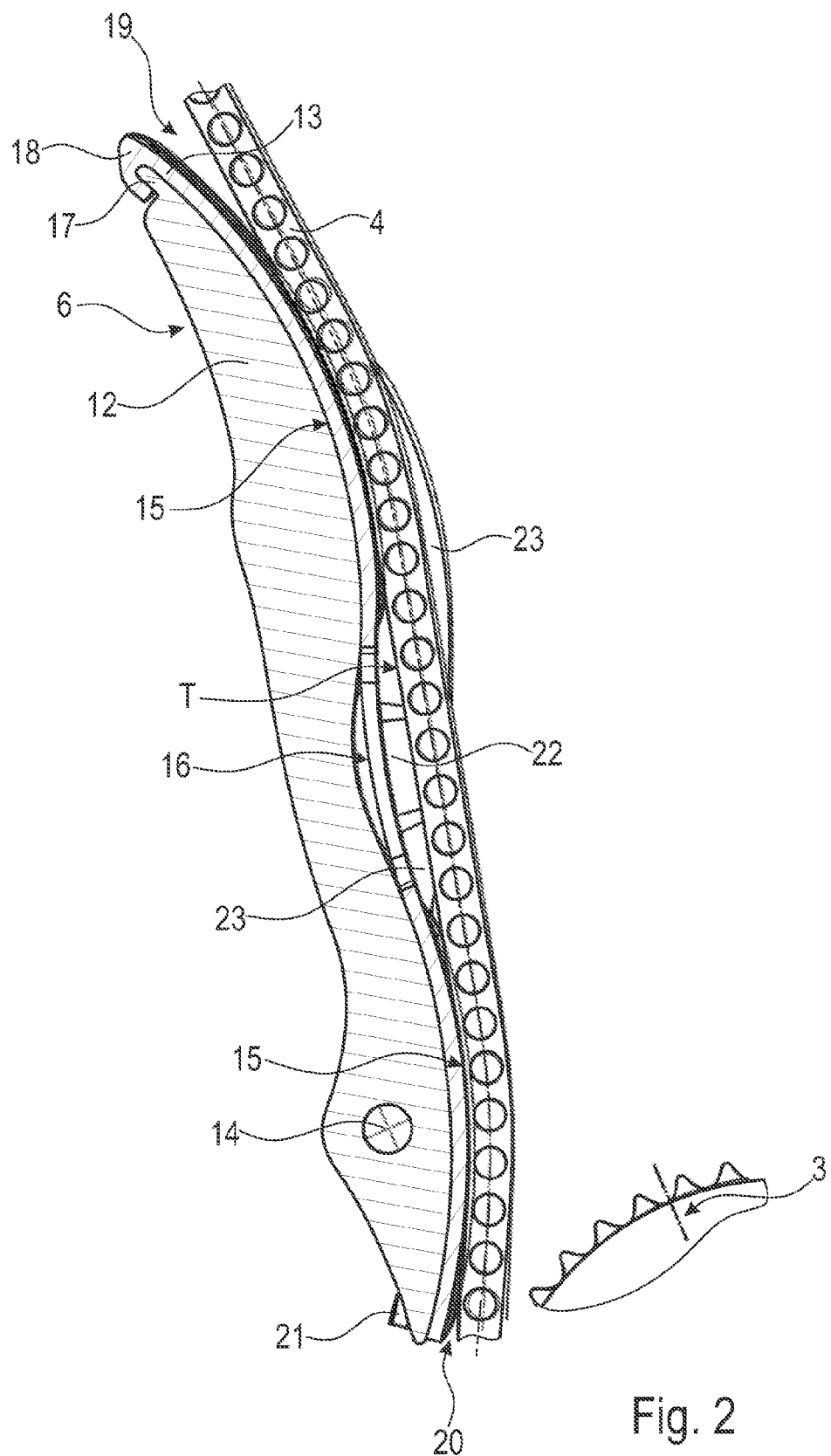
FIG. 2 shows a sectional view through the tensioning or guide rail according to FIG. 1.

FIG. 2 shows an enlarged sectional view of the tensioning rail 6 according to the present invention arranged in the timing chain drive 1 in FIG. 1. The tensioning rail 6 is bipartite and comprises a central carrier body 12 and a sliding body 13 extending over the front of the carrier body 12 facing the drive or timing chain 4. The tensioning rail 6 is here pivotably supported at the pivot point 14 and it is in contact with the drive chain 4 via the chain guide sections 15. The two chain guide sections 15 have arranged between them a recessed section 16 of the tensioning rail 6, at which the tensioning rail 6 is not in contact with the drive chain 4. As can clearly be seen in FIG. 2, a large area in which the drive chain 4 is not in contact with the sliding body 13 is obtained between the drive chain 4 tensioned over the chain guide sections 15 and the recessed section 16, the lower side of said drive chain 4 defining simultaneously the tangent T between two chain guide sections 15.

At a tensioning end or meshing end of the tensioning rail 6 facing away from the pivot point 14, the carrier body 12 has a protruding nose 17 engaging a pocket 18 of the sliding body 13 so as to fix the sliding body 13 at said tensioning end. The sliding body 13 extends in one piece along the tensioning-side meshing end 19 of the drive chain 4 over the chain guide section 15 and the recessed section 16 up to the chain guide section 15 at the exit end 20 of the drive chain 4 close to the pivot point 14. In the area of the exit end 20, the sliding body 13 is secured to the carrier body 12 by means of a locking element 21. The sliding body 13 extending between the carrier body 12 and the drive chain 4 is in contact with the drive chain 4 in the area of the two concave chain guide sections 15 at the meshing end 19 and the exit end 20. In the recessed section 16, the sliding body 13 extends in spaced relationship with the drive chain 4, so that the surface 30 of the sliding body 13 is not in contact with the drive chain 4. This results in a wavelike shape of the sliding body 13 along the carrier body 12 of the tensioning rail 6 with a correspondingly reduced area of contact between the drive chain 4 and the sliding body 13.

In the area of the recessed section 16, the sliding body 13 is held in spaced relationship with the drive chain 4 by means of a downholder 22. The downholder 22 is configured as a protruding nose arranged on the cheek 23 defined by the carrier body 12. The cheek 23 extends from the carrier body 12 up to and beyond the sliding body 13 laterally of the drive chain 4 and allows said drive chain 4 to be laterally guided and secured.

Figure 3:
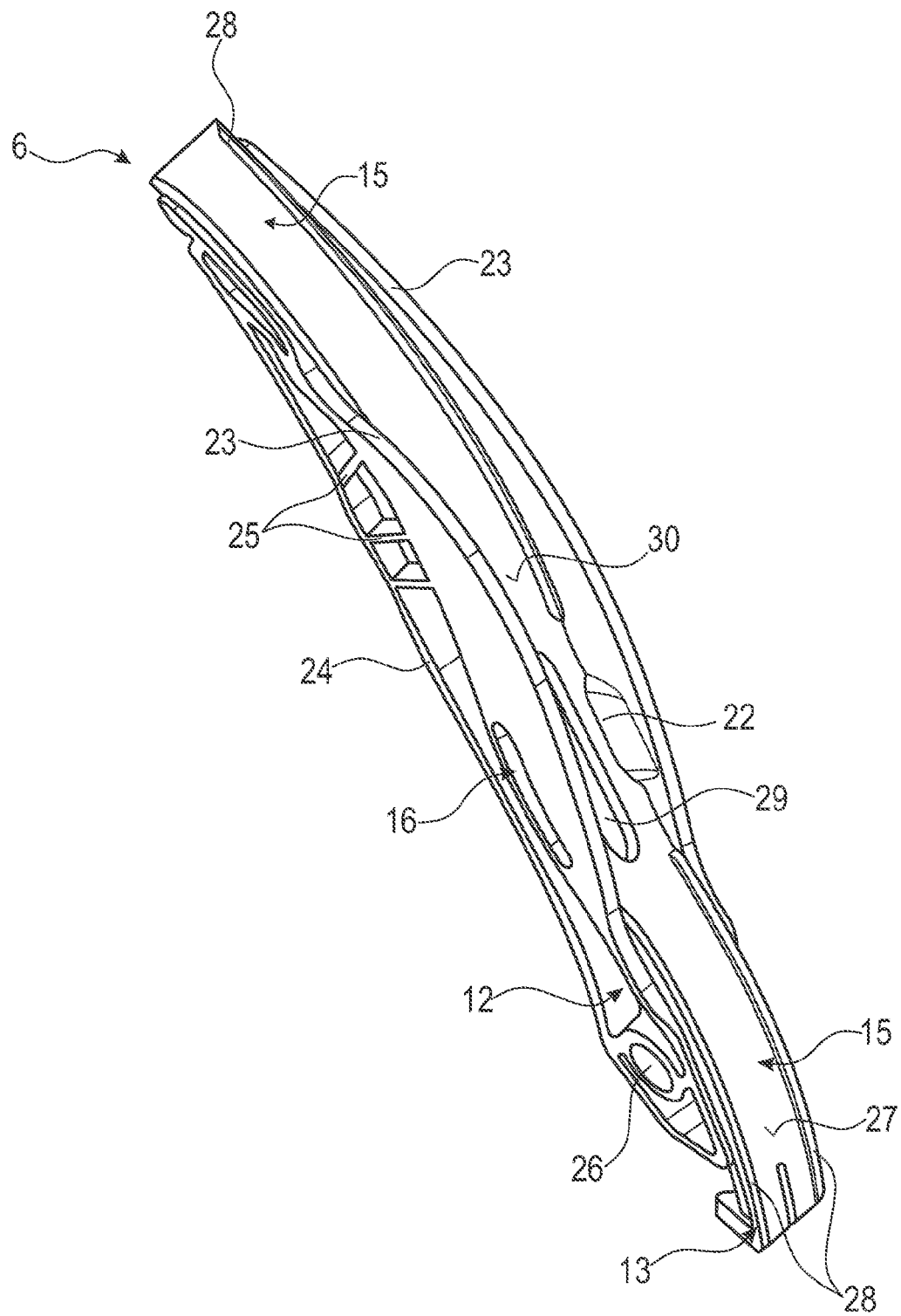
FIG. 3 shows a perspective top view of the tensioning or guide rail according to the present invention of FIGS. 1 and 2.

FIG. 3 shows an enlarged perspective side view of the tensioning rail 6 according to the present invention of FIGS. 1 and 2. The sliding body 13 of the tensioning rail 6 extends here, in a wavelike manner, over the carrier body 12 on the side of the tensioning rail 6 facing the drive chain 4. The carrier body 12 comprises a lower longitudinal member 24 and a cross member 25 defining, in common, a truss structure for stiffening the carrier body 12. The open areas of the truss structure delimited by the lower longitudinal member 24 and the cross members 25 are interrupted by a central partition so as to improve the stability. On the side of the carrier body 12 facing the drive chain 4, cheeks 23 extend on both sides laterally of the sliding body 13 in the direction of the drive chain 4, said cheeks 23 covering the drive chain 4 laterally, as can be seen in FIG. 1. The cheek 23 facing the viewer in FIG. 3 is reduced in length for structural reasons. At the pivot end of the tensioning rail 6 facing the exit end 20, the longitudinal member 24 and a cross member 25 have formed between them a pivot bearing sleeve 26 in which the pivot point 14 is located.

On the side facing the drive chain 4, the sliding body 13 is provided with a smooth sliding-contact surface 27 along which the drive chain 4 slides in the area of the chain guide sections 15. The sliding-contact surface 27 has provided thereon lateral sliding-contact guide sections 28 in the area of the chain guide sections 15, said sliding-contact guide sections 28 protruding substantially perpendicularly from the sliding-contact surface 27 and defining, in the area of the chain guide sections 15, a lateral guide for the drive chain 4. In the area of the recessed section 16, downholders 22 are provided on both sides on the cheeks 23. The inwardly protruding nose-shaped downholders 22 fix the sliding body 13 in the area of the recessed section 16 in spaced relationship with the drive chain 4 and allow thus the wavelike arrangement of the sliding body 13 on the carrier body 12 and the reduced contact of the drive chain 4 at the protruding chain guide sections 15 of the tensioning rail 6. In combination with the fixing of the sliding body 13 on the meshing end 19 and the exit end 20, a concave shape of the sliding body 13 is thus obtained in the area of the recessed section 16 and a convex shape is obtained at the adjoining chain guide sections 15. In the area of the downholders 22, the sliding body 13 has an opening 29 in the recessed section 16. By means of said opening 29, the sliding body 13 can be mounted and fixed more easily to the downholders 22 and, simultaneously, said opening 29 reduces the material used for the sliding body 13 in the recessed section 16 which is not under load.

For a tensioning rail 6 according to the present invention of the type shown in FIGS. 1 to 3, the carrier body 12 and the sliding body 13 are produced by means of separate injection molding processes, the material used for the carrier body 12 being e.g. a fiber-reinforced thermosetting plastic and the material used for the sliding body 13 being e.g. a plastic material having good sliding characteristics. Alternatively, the tensioning rail 6 may also be produced in a two-component injection molding process making use of respective different materials for the carrier body 12 and the sliding body 13, or by attaching the sliding body 13 to a prefabricated carrier body 12 by means of an injection molding process. When a separately produced sliding body 13 is mounted onto the carrier body 12, the pocket 18 of the sliding body 13 is first pushed onto the nose 17 of the carrier body 12 and subsequently the sliding body 13 is fixed in position at the exit end 20 via the locking element 21. Only the subsequent pushing of the sliding body 13 into the recessed section 16 and its fixing and clamping at the downholders 22 will lead to the wavelike arrangement of the sliding body 13 on the carrier body 12 and, simultaneously, to the reliable fixing and clamping of the sliding body 13 at the nose 17 and the locking element 21.

LIST OF REFERENCE NUMERALS 1 timing chain drive
2 camshaft sprockets
3 crankshaft sprocket
4 drive or timing chain
5 guide rail
6 tensioning rail
7 engine case
8 tensioning device
9 tensioning piston
10 press-on area
11 sliding body
12 carrier body
13 sliding body
14 pivot point
15 chain guide section
16 recessed section
17 protruding nose
18 pocket
19 meshing end
20 exit end
21 locking element
22 downholder
23 cheek
24 lower longitudinal member
25 cross members
26 pivot bearing sleeve
27 sliding-contact surface
28 sliding-contact guide sections
29 opening
30 surface
T tangent

The invention claimed is:

1. A tensioning or guide rail for a drive chain, comprising a carrier body with at least a first chain guide section at a meshing end of the drive chain and a second chain guide section at an exit end of the drive chain and with at least one recessed section, said at least one recessed section being arranged between two chain guide sections and recessed relative to a tangent connecting the adjoining chain guide sections, and said at least two chain guide sections having each a sliding-contact surface for contacting the drive chain, wherein a continuous sliding body is provided, which is arranged on the carrier body along the at least two chain guide sections and the at least one recessed section, said sliding body defining sliding-contact surfaces of the at least two chain guide sections and a surface of the at least one recessed section, said surface facing the drive chain.

2. The tensioning or guide rail according to claim 1, wherein, in the at least one recessed section, at least one downholder is provided on the carrier body.

3. The tensioning or guide rail according to claim 2, wherein the downholder is formed on the carrier body.

4. The tensioning or guide rail according to claim 1, wherein the carrier body comprises at least one cheek extending in the area of the recessed section at least partially above the tangent.

5. The tensioning or guide rail according to claim 4, wherein the at least one cheek has a downholder provided thereon.

6. The tensioning or guide rail according to claim 1, wherein the carrier body comprises trusslike stiffeners.

7. The tensioning or guide rail according to claim 1, wherein the sliding body comprises an opening in the area of the at least one recessed section.

8. The tensioning or guide rail according to claim 7, wherein the opening is formed centrally on the sliding body.

9. The tensioning or guide rail according to claim 1, wherein the sliding body comprises respective convex sections in the area of the meshing end and in the area of the exit end of the drive chain, the convex sections in the area of the meshing end and in the area of the exit end of the drive chain having provided between them at least one concave section or one straight section.

10. A timing chain drive of an internal combustion engine, comprising a drive sprocket and at least one driven sprocket, a drive chain connecting the drive sprocket and the at least one driven sprocket, and a tensioning or guide rail according to claim 1.

* * * * *